July 28, 1931.  J. L. WOODWORTH  1,816,755
SELECTIVE CONTROL SYSTEM
Filed April 12, 1930    2 Sheets-Sheet 1
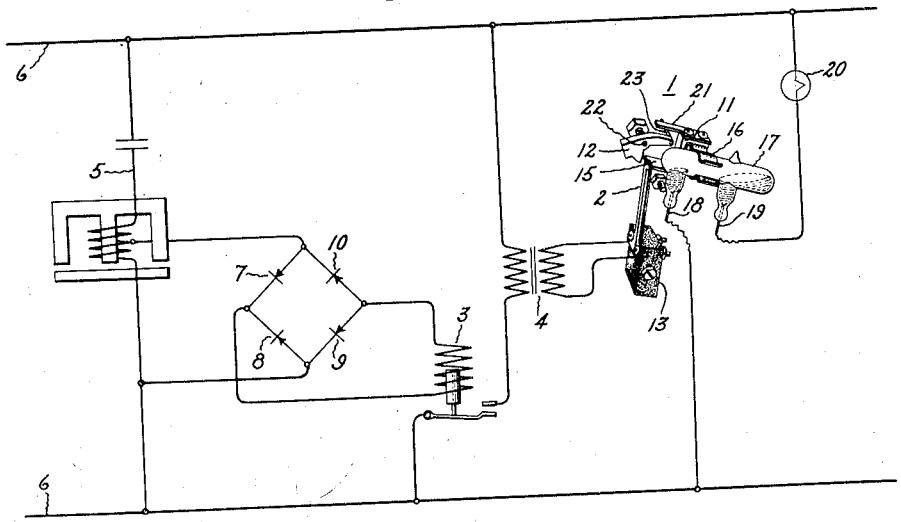
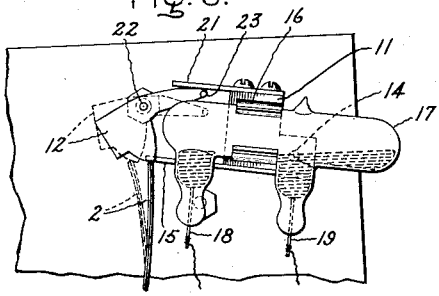
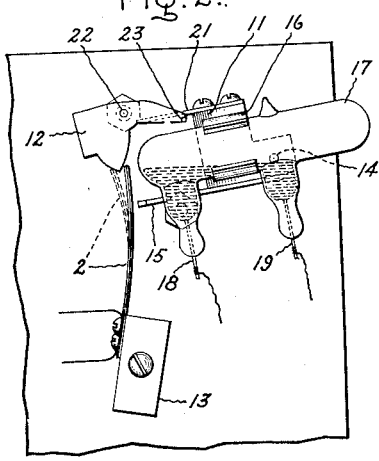
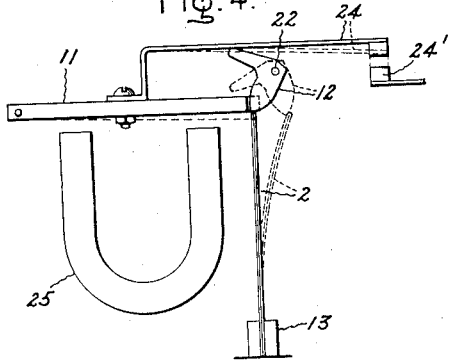
Inventor:
John L. Woodworth,
by Charles E. Tullar
His Attorney.

July 28, 1931.  J. L. WOODWORTH  1,816,755
SELECTIVE CONTROL SYSTEM
Filed April 12, 1930  2 Sheets-Sheet 2
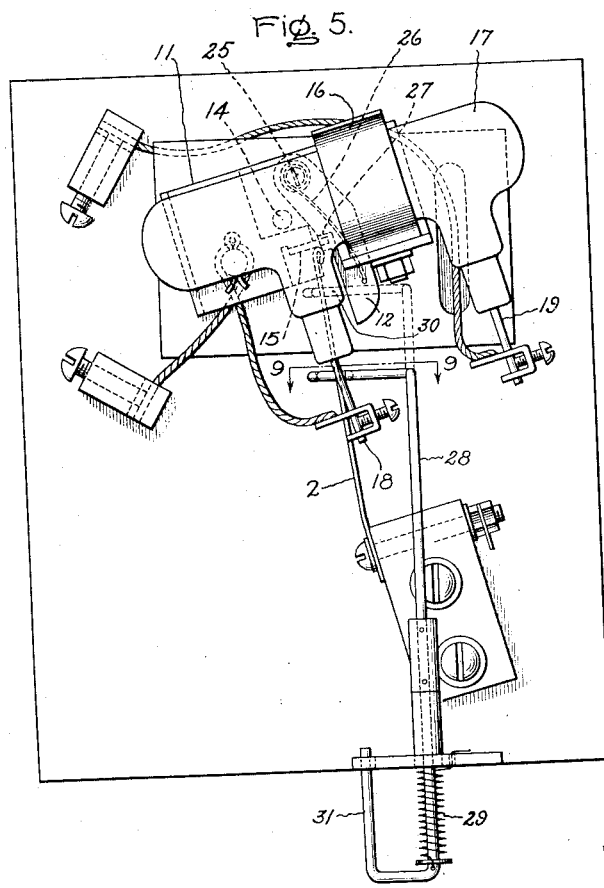
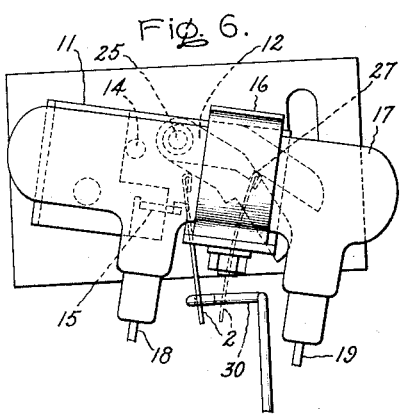
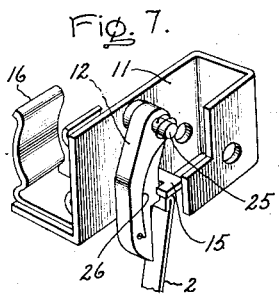
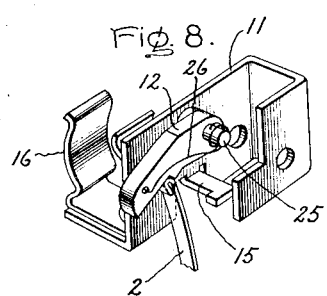
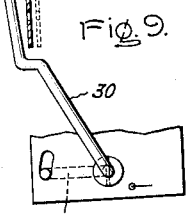
Inventor:
John L. Woodworth,
by Charles E. Tullar
His Attorney.

Patented July 28, 1931

1,816,755

UNITED STATES PATENT OFFICE

JOHN L. WOODWORTH, OF SCHENECTADY, NEW YORK, ASSIGNOR TO GENERAL ELECTRIC COMPANY, A CORPORATION OF NEW YORK

SELECTIVE CONTROL SYSTEM

Application filed April 12, 1930. Serial No. 443,909.

My invention relates to time selective systems for effecting remote control operations. It has for one of its objects to provide an improved mechanical arrangement of elements whereby a control member such, for example, as an electric switch, may be selectively operated from one position to another from a remote point in response to different durations of energization of a receiving electro-responsive device.

A further object of the invention is to provide a time selective relay which may be economically constructed, which is reliable in its operation and which further comprises a single electro-responsive element.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 represents a high frequency receiving system employing a relay constructed in accordance with my invention; Figs. 2 and 3 are views of the relay shown in Fig. 1 in which the circuit controlling member is shown in different positions; Fig. 4 represents a modification of the relay shown in Fig. 1; Fig. 5 represents a further modification; Fig. 6 shows a relay constructed in accordance with the disclosure of Fig. 5, but in which the circuit-controlling member is shown in a different position, and Figs. 7, 8 and 9 represent details of the arrangement shown in Figs. 5 and 6.

Referring to Fig. 1 of the drawings I have shown a high frequency receiving system employing a relay 1 constructed in accordance with my invention for controlling a translating device such, for example, as the lamp 20, which may comprise one of the units of an ordinary street lighting system. This relay 1 includes a thermal responsive element 2 which is arranged to be energized by means of a relay 3 and transformer 4 in response to high frequency energy received in the tuned circuit 5. This tuned circuit is connected across the power circuit 6 from which the translating devices are energized, and is adjusted to respond to high frequency electromotive force received thereover from a remote point.

The inductance of the tuned circuit is in the form of an auto transformer having a core of low magnetic reluctance across a portion of which is connected a group of rectifiers 7, 8, 9 and 10.

These rectifiers may comprise asymmetrically conducting devices of any suitable construction. If desired they may comprise electron discharge devices of well known type. Preferably, however, these devices are of the form comprising a copper plate having cuprous oxide formed thereon and mounted between suitable electrodes as shown and described in United States Patent No. 1,640,335 to Lars O. Grondahl, issued August 23, 1927. As shown these devices are connected in a well-known four-sided bridge arrangement, one pair of diagonally opposite terminals of the bridge being connected across a portion of the inductance of the tuned circuit 5, and the other pair of opposite terminals of the bridge being connected across the winding of relay 3. These devices are asymmetrically conducting and are so arranged that during one-half cycle of the received alternating current wave, current flows from the intermediate point on the inductance of the tuned circuit through the rectifier 7, relay 3, and rectifier 9 to the lower terminal of the inductance. During the opposite half-cycle current flows from the lower terminal of the inductance through rectifier 8, relay 3 and rectifier 10 to the intermediate point on the inductance. Thus current flows in the same direction through the winding of relay 3 during both half cycles of the received alternating current wave.

The primary winding of transformer 4 is connected across the circuit 6. This transformer has a step-down ratio such that when relay 3 is energized it supplies sufficient current to the thermostatic element 2 of the relay to cause desired heating and flexure thereof.

The relay 1 comprises essentially three parts, viz: the electroresponsive element 2, the control member 11, and a mechanical interconnection between the control member 11 and electroresponsive element 2 which, in the form shown in Fig. 1, comprises a trigger member 12.

The electroresponsive element 2 may be of any suitable construction comprising a member having a normal position from which it is adapted to be actuated by different degrees of distances depending upon the duration of energization thereof, and to which it returns, as under a bias, after deenergization. In the form shown in the drawings it comprises a bi-metallic strip having a longitudinal slit extending from the lower end of the strip upward to a point a short distance from the upper end of the strip. This slit divides the strip into two legs which are electrically separated at the lower terminal thereof and connected at the upper end. The lower ends of these legs are connected to the opposite terminals of the secondary winding of transformer 4. Thus current from one terminal of the winding 4 flows the entire length of the strip and back to the opposite terminal of the winding. This bi-metallic strip may be suitably mounted upon a portion 13 of the framework of the relay, to which it is attached at its lower end. The upper end of the strip is left free to move back and forth from the normal position due to flexure of the strip in response to heating and cooling. The strip may be said to be inherently biased to the normal position since it always returns thereto upon cooling.

The control member 11 is pivoted at the point 14, as indicated in Figs. 2 and 3, and comprises a member 15 attached to the lower portion thereof and which extends to the left as shown in Fig. 1 just sufficiently to project over the end of the bi-metallic strip 2 when the control member is in its circuit-opening position thereby to restrain the control member in this position against its bias due to gravity.

Mounted upon the side of the member 11 is a clamp 16 for supporting a tube 17 containing mercury. This tube 17 has two protuberances through which lead-in wires 18 and 19 extend, these wires being connected across the circuit 6 through the lamp 20 which is to be controlled. The amount of mercury in the tube is sufficient to permit the circuit between the two lead-in wires to be broken when the tube occupies the position shown in Fig. 1, and closed when it occupies its alternate position which is that shown in Fig. 2.

The member 11 also has an additional member 21 attached to the top thereof and which extends to the left substantially parallel with and above member 15. This member cooperates with the trigger member 12 in a manner presently to be indicated.

The trigger member 12 is pivoted about the point 22 and comprises a weighted portion which extends both to the left and downwardly from this point, and an arm which extends to the right. This lower portion of trigger 12 is sword shape at its lower point and is arranged to cooperate with the end of the strip 2 when it flexes to the left. An additional arm 23 attached to the right-hand end of the trigger 12 extends backwardly and underneath the member 21. The trigger 12 is so balanced about its pivot that when the control member 11 is held in its upper position it assumes the position shown in Fig. 1.

The operation of the relay will now be described: When high frequency energy is received causing energization of relay 3 and transformer 4, and heat is thereby applied to the thermal electric element 2, this element will flex to the left, as shown in full lines in Fig. 2, thereby slipping out from under the member 15 and permitting the control member 11 to drop, under the force of gravity, or other bias, which may be provided, to the position shown in Fig. 2. If the received carrier energy is now interrupted, the circuit control member will remain in this position thereby leaving the circuit between the two lead-in wires 18 and 19 closed and the lamp 20 lighted. The thermostatic element will cool and return to the position shown in Fig. 1. The trigger member 12 will be held in the position shown in Fig. 2 by the member 21.

If it be desired now to extinguish the lamp 20 carrier energy will be supplied to the power circuit for a longer period than was required for the purpose of energizing the lamp 20. The thermostatic element 2 will then be flexed to the left-hand dotted position shown in Figs. 2 and 3, causing the trigger member to swing clockwise about its pivot until it is disengaged by the member 2 and falls back to the position shown in Fig. 2. If it be assumed that the carrier energy is then interrupted, upon cooling, the strip will engage behind the downward projecting portion of the trigger 12, as shown by dotted lines in Figs. 2 and 3, thereby carrying it toward the right and, through the lever action of the trigger 12, forcing the arm 23 and member 21 upward. When the member 21 has been sufficiently lifted to carry the mercury tube to the position shown in Fig. 1, the thermostatic strip will slip past the trigger 12 and again enter under the member 15 whereby the member 11 is retained in the circuit-opening position. In Fig. 3 the full lines show the thermostatic element just as it is slipping past the trigger 12 and entering under the member 15 to assume the position shown in Fig. 1 and thereby retain the tube 17 in circuit-opening position.

Fig. 4 shows a modification of my invention in which the member 11 is in the form of a magnetic armature carrying movable contact member 24 of an electric switch 24, 24'. The member 11 is biased downwardly by means of a permanent horseshoe magnet 25 which gives the switch a rapid, or snap, make and break action. The operation will readily be understood from Figs. 1, 2 and 3. Upon flexure of the element 2 to the right, it slips out from under the armature 11 and thereby permits the contacts of the switch to close. Upon a further flexure of the element 2, as in response to heating for a longer period, it passes the trigger 12 and, upon cooling, carries the lower portion of the member 12 backward and through its lever action forcing the contact member 24 and, hence, the armature 11 upward into the normal position. When the contact 24 reaches the normal position the element 2 will slip past the lower end of the trigger and enter under the armature 11.

The form of the invention shown in Figs. 5, 6, 7 and 8 differs from those shown in Figs. 1, 2, 3 and 4 materially only in that the trigger member 12 is pivotally attached to the member 11, rather than to a fixed point upon the framework of the relay. The member 11 comprises a pressed sheet metal U-shaped portion. The member 15 is pressed out from the side of the U, as better shown in Figs. 7 and 8, at a point such that it rests upon the end of the thermostatic element and thereby supports the member 11 in its upper position. The trigger 12 is pivoted at a point 25, near the upper portion of the member 11, and is biased by means of a spring 26 to bear against the member 15. Upon flexure of the member 2 to the right, as shown in Figs. 5 and 6, or to the left, as shown in Figs. 7 and 8, the thermostatic element leaves the member 15 and hence permits the member 11 and mercury tube 17 to drop to the position shown in Fig. 6, whereby the circuit is closed between the lead-in conductors 18 and 19. If the carrier is now interrupted the relay will remain in this position. Upon cooling the strip 2 will substantially assume its normal position although as shown partially in full lines in Fig. 6 it will be held therefrom by the edge of member 15.

If the thermostatic element is now heated for a longer period, as in response to a longer carrier signal, it will flex further to the right against the bias of the trigger 12 to a position shown in Fig. 6, and upon cooling after interruption of the carrier, will engage in a notch 27 in the lower surface of the trigger member. As the cooling continues the member 2 tends to return to its initial position, bearing against the notch in the trigger member 12 and thereby raises the member 11 and the mercury 17 upward about their pivot and thereby returns them to the position shown in Fig. 5. The notch 27 is so located in the member 12 that just as the mercury tube reaches the position shown in Fig. 5, the element 2 will be permitted to slip out of the notch 27 and enter underneath the member 15 whereby it retains the mercury tube in the position shown in Fig. 5.

In case, in the operation of a relay of the type disclosed for the purpose of controlling street lamps, for example, the lamp controlled by a particular relay burns out means are provided in accordance with the invention whereby the operator may conveniently determine whether the fault is due to a faulty operation of the relay or to defect in the lamp. This means is shown in Figs. 5, 6 and 9 and comprises a lever member 28 which may extend vertically through the housing containing the relay. This member is arranged for reciprocal movement between two positions both in the vertical plane and horizontal plane and is biased downwardly by means of a spring 29. As shown in the drawings this member is arranged to cooperate with the clamping member 16, or some portion of member 11, in such a way that when it is pressed upward by the operator, it engages the lower portion of the clamping member and forces the mercury tube into the position shown in Fig. 5. The member 28 may then be released and the mercury tube will be held in this position by the element 2. The upper portion of the member 28 is bent to the left as shown in Figs. 5, 6 and 9 into an arm 30. Fig. 9 is a view of the arm looking downward from line 9—9 of Fig. 5. This arm is arranged to cooperate with the element 2. Thus if the operator turns the member 28 in a clockwise direction as shown in Fig. 9, the arm 30 will engage the thermostatic strip 2 and deflect it sufficiently to release the member 11 and thereby permit the mercury tube to assume the position shown in Fig. 6. An arm 31 is provided at the lower portion of the member 28 and preferably on the outside of the relay housing to permit convenient manipulation of the relay by the operator. Thus the circuit through the mercury tube may very readily be opened and closed by manipulation of the member 28 and in this way the operator may readily ascertain as to whether the lamp is defective.

It will now be apparent that the relay is one which may be conveniently mounted together with a suitable carrier current receiving circuit shown in Fig. 1, in the base of street lamps, for example, there being one such system for each lamp, or if desired, group of lamps. As shown in Fig. 1 these relays may be readily controlled over the power circuit which supplies energy to the lamps by means of carrier impulses, or signals, of different durations.

While I have shown certain specific embodiments of my invention, it will of course be understood that I do not wish to be limited thereto since many modifications may be made in the nature and arrangement of elements employed, and I therefore contemplate by the appended claims to cover any such modifications as fall within the true spirit and scope of my invention.

What I claim as new and desire to secure by Letters Patent of the United States, is:

1. The combination, in a relay, of an electroresponsive element biased to a normal position, said element being adapted upon energization thereof to be actuated from said normal position by an amount dependent upon the duration of energization and upon deenergization to be actuated under its bias toward its normal position, a member adapted for reciprocal operation between two positions and a mechanical interconnection between said member and said element whereby said member is selectively operated from either position to the other position dependently upon the distance said element is actuated from said normal position when deenergized.

2. In combination, a control member adapted for reciprocal operation between two positions, a thermostatic element adapted for different degrees of movement dependent upon the duration of application of heat thereto, means for applying heat to said element, and means whereby in response to a certain degree of movement of said element said control member is actuated from one position to the other, and in response to a greater degree of movement of said element said member is actuated from said other position to the first position.

3. In combination, a control member biased to one position and adapted for reciprocal operation between said one position and a second position, thermostatic element having a normal position, said element being adapted for different degrees of movement therefrom dependent upon the duration of application of heat thereto, means for applying heat to said element, a mechanical interconnection between said control member and thermostatic element, said control member, thermostatic element, and interconnection being so arranged with respect to each other that upon a certain movement of said thermostatic element from the normal position in response to application of heat thereto said member is operated from said second position under its bias to said one position and upon a greater movement of said element and removal of heat therefrom said interconnection restores said member to said one position in response to the cooling of said element.

4. In combination, a control member biased for reciprocal operation between two positions, a thermostatic strip adapted for different degrees of flexure dependent upon the duration of application of heat thereto, means for applying heat to said thermostatic strip, said control member and thermostatic strips being arranged, upon a certain degree of flexure of said strip, to cause said member to be actuated under its bias from one position to the other, and means responsive to cooling of said strip only after a greater degree of flexure thereof for restoring said member to the initial position.

5. In combination, a thermostatic strip, a control member arranged for reciprocal operation between two positions, said member being biased to one of said positions and arranged to be supported in the other of said positions against its bias by said strip, said strip being so arranged with respect to said member that when said member is in said other position upon a certain degree of flexure of said strip said member is released and actuated to said one position under its bias, and means responsive to a greater degree of flexure of said strip for actuating said member from said one position to the other position.

6. In combination, a thermostatic strip, a control member arranged for reciprocal operation between two positions, said member being biased to one of said positions and arranged to be supported in the other of said positions against its bias by said strip, said strip being so arranged with respect to said member that upon a certain degree of flexure thereof said member is released and actuated to said one position under its bias, means for heating said strip to cause flexure thereof, and means responsive to cooling of said strip only after a greater degree of flexure thereof to restore said member to said other position.

7. In combination, a thermostatic strip, a control member arranged for reciprocal operation between two positions, said member being biased to one of said positions and arranged to be supported in the other of said positions against its bias by said strip, said strip being so arranged with respect to said member that upon a certain degree of flexure thereof said member is released and actuated to said one position under its bias, a trigger member pivotally attached to said control member and having a notch, said trigger member and notch being so arranged that upon a greater flexure of said strip the end of said strip becomes engaged in said notch whereby upon cooling of said strip said control member is returned to the said other position by said strip and trigger member, and the strip is returned to supporting relation with said control member.

8. In combination, a thermostatic element, a control member arranged for reciprocal operation between two positions, said member being biased to one position and arranged to be supported in the other position against its bias by said strip, whereby upon a certain movement of said element said member is released from said other position and actuated under its bias to said one position, means responsive to a greater movement of said element to actuate said member back to said other position, means for heating said element to cause different degrees of movement thereof and means independent of said last means to cause sufficient movement of said element to release said member from said other position and to restore it to said other position after it is actuated to said one position under its bias.

In witness whereof, I have hereunto set my hand this 11th day of April, 1930.

JOHN L. WOODWORTH.